US 10,889,430 B2

(12) United States Patent
Hull et al.

(10) Patent No.: US 10,889,430 B2
(45) Date of Patent: Jan. 12, 2021

(54) ENVIRONMENTAL CONTAINMENT DEVICE

(71) Applicants: Joshua Hull, Dickinson, TX (US);
Daniel Goynes, Dickinson, TX (US)

(72) Inventors: Joshua Hull, Dickinson, TX (US);
Daniel Goynes, Dickinson, TX (US)

(*) Notice: Subject to any disclaimer, the term of this patent is extended or adjusted under 35 U.S.C. 154(b) by 73 days.

(21) Appl. No.: 16/119,779

(22) Filed: Aug. 31, 2018

(65) Prior Publication Data

US 2019/0071246 A1 Mar. 7, 2019

Related U.S. Application Data

(60) Provisional application No. 62/553,680, filed on Sep. 1, 2017.

(51) Int. Cl.
*B65D 90/24* (2006.01)
*B65D 90/00* (2006.01)
*F16N 31/00* (2006.01)

(52) U.S. Cl.
CPC ......... *B65D 90/24* (2013.01); *B65D 90/0033* (2013.01); *F16N 31/006* (2013.01)

(58) Field of Classification Search
CPC ............... B65D 90/24; B65D 90/0033; B65D 90/0026; B65D 81/26; B65D 1/40; B65D 25/005; B65D 25/14; F16N 31/006; F16N 31/00
USPC ........ 220/560.03, 573, 571, 661, 62.21, 9.4, 220/9.1
See application file for complete search history.

(56) References Cited

U.S. PATENT DOCUMENTS

| | | | | |
|---|---|---|---|---|
| 2,378,159 A | * | 6/1945 | Royer ................. | B65D 90/205 220/565 |
| 4,739,895 A | * | 4/1988 | Bachmann ............ | B65D 90/24 220/560.03 |
| 5,090,588 A | * | 2/1992 | Van Romer ............. | B64D 1/16 184/106 |
| 5,316,175 A | * | 5/1994 | Van Romer ........... | F16N 31/006 220/4.12 |
| 5,924,461 A | * | 7/1999 | Shaw .................... | F16N 31/006 141/86 |
| 6,092,686 A | * | 7/2000 | Shaw .................... | E04H 4/0056 220/573 |
| 8,636,445 B1 | * | 1/2014 | Williams ............... | B65D 90/24 220/9.4 |

* cited by examiner

*Primary Examiner* — Robert J Hicks
(74) *Attorney, Agent, or Firm* — Polsinelli PC (57) ABSTRACT

An environmental containment device includes a baseplate extending a longitudinal length and two ends disposed at opposing ends of the longitudinal length. The baseplate has two longitudinal edges extending along the longitudinal length and two lateral edges extending along a lateral width of the baseplate. A flexible sidewall can extend along at least a portion each of the lateral edges and vertically extend away from the baseplate a second predetermined distance. The baseplate flexible sidewall collectively define a containment space.

23 Claims, 9 Drawing Sheets

ENVIRONMENTAL CONTAINMENT DEVICE

FIELD

This application claims the benefit of U.S. Provisional Application No. 62/553,680, filed Sep. 1, 2017, the contents of which are incorporated by reference in their entirety.

FIELD

The present disclosure relates generally to environmental containment. More specifically, the present disclosure relates to environmental containment devices for secondary containment of primary containment storage containers.

BACKGROUND

Environmental containment devices are typically implemented to prevent leeching of fluid from storage containers into the adjacent environment. Often these environmental containment devices have rigid sidewalls to contain the fluid within the device. Rigid sidewalls prevent the ease ingress and egress from the device with heavy machinery utilized to place the storage containers in the device.

BRIEF DESCRIPTION OF THE DRAWINGS

Implementation of the present technology will now be described, by way of example only, with reference to attached figures, wherein.

The various examples described above are provided by way of illustration only, may not be shown to scale, and should not be construed to limit the scope of the disclosure.

DESCRIPTION OF EXAMPLE EMBODIMENTS

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. "Coupled" refers to the linking or connection of two objects. The coupling can be direct or indirect. An indirect coupling includes connecting two objects through one or more intermediary objects. Coupling can also refer to electrical or mechanical connections. Coupling can also include magnetic linking without physical contact.

"Substantially" refers to an element essentially conforming to the particular dimension, shape or other word that substantially modifies, such that the component need not be exact. For example, substantially cylindrical means that the object resembles a cylinder, but can have one or more deviations from a true cylinder.

The term "comprising" means "including, but not necessarily limited to"; it specifically indicates open-ended inclusion or membership in a so-described combination, group, series and the like.

Even though numerous characteristics and advantages of the present technology have been set forth in the following description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the examples described above can be modified within the scope of the appended claims. Claim language reciting "at least one of" a set indicates that one member of the set or multiple members of the set satisfy the claim. For example, at least one of A, B, and C, indicates the members can be just A, just B, just C, A and B, A and C, B and C, or A, B, and C.

The present disclosure is drawn to an environmental containment device. The environmental containment device can include a baseplate extending a longitudinal length and have two ends disposed at opposing ends of the longitudinal length. The baseplate can have two longitudinal edges extending along the longitudinal length and two lateral edges extending along a lateral width of the baseplate. A rigid sidewall can extend at least a portion each of the longitudinal edges and can vertically extend away from the baseplate a predetermined distance. A flexible sidewall can extend along at least a portion each of the lateral edges and can vertically extend away from the baseplate a second predetermined distance. The baseplate, rigid sidewall, and flexible sidewall collectively define a containment space.

Figure 1:
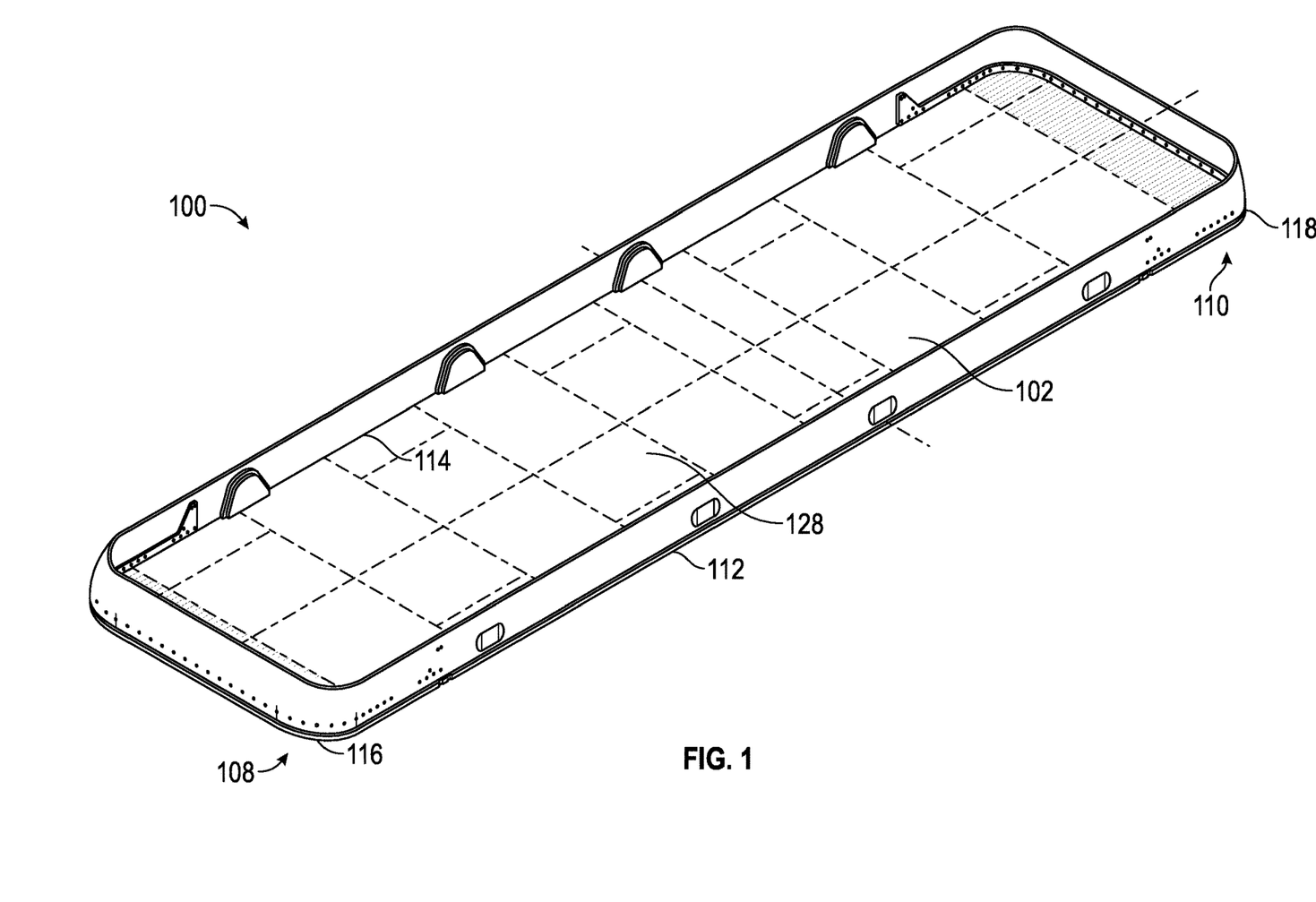
FIG. 1 is an isometric view of an environmental containment device according to the present disclosure.

FIG. 1 shows an isometric view of an environmental containment device. An environmental containment device 100 can have a baseplate 102 having longitudinal length 104 and a lateral width 106. The baseplate 102 can have two ends 108, 110 disposed at opposing ends of the longitudinal length 104.

The baseplate 102 can have two longitudinal edges 112, 114 extending along the longitudinal length and two lateral edges 116, 118 extending along the lateral width. The lateral edge 116 can be formed at one of the two opposing ends 108, 110 and can extend between and connect the two longitudinal edges 112, 114. The lateral edge 118 can be formed at the other of the two opposing ends 108, 110 and can extend between and connect the two longitudinal edges 112, 114.

A rigid sidewall 120 can be formed along at least a portion of each longitudinal edge 112, 114. The rigid sidewall 120 can be welded, fastened, integrally formed, or any combination thereof with the baseplate 102. The rigid sidewall 120 can be formed from the same material as the baseplate 102. The rigid sidewall 120 can vertically extended away from the baseplate 102 a predetermined height 122.

A flexible sidewall 124 can be formed along at least a portion of each lateral edge 116, 118. The flexible sidewall 124 can be formed from [X], [Y], and/or [Z]. The flexible sidewall 124 can vertically extended away from the baseplate 102 a second predetermined height 126. The flexible sidewall 124 can also extend along at least a portion of the longitudinal edge 112, 114. In at least one example, the flexible sidewall 124 extends along a portion of the longitudinal edge 112, 114 and overlaps a portion of the rigid sidewall 120.

In at least one example, the predetermined height 122 and the second predetermined height 126 are the same. In other examples, the predetermined height 122 of the rigid sidewall 120 can be greater than or less than the second predetermined height 126 of the flexible sidewall 124.

The baseplate 102, rigid sidewall 120, and flexible sidewall 124 can collectively define a containment space 128. The containment space 128 can be a leak-proof volume configured to receive and/or contain one or more fluids, gels, or other fluidic materials. The predetermined height 122 and second predetermined height 126 can substantially define the containment space 128 containment volume. In at least one example, the predetermined height 122 and second predetermined height 126 can be selected based on the desired containment volume within the containment space 128. In other examples, the size of the baseplate 102, predetermined height 122, and/or the second predetermined height 126 can be varied to obtain the desired containment volume within the containment space 128.

The flexible sidewall 124 can extend along the lateral edge 116, 118 and curve to couple with the rigid sidewall 120 along the longitudinal edge 112, 114. The curvature formed by the flexible sidewall 124 can provide structural support for the flexible sidewall 124 and further define the containment space 128.

The flexible sidewall 124 can allow deflection, or deviation, from the vertical during load to allow vehicles, carts, or other storage container carrying devices to enter the containment space 128 to add or remove one or more storage containers.

Figure 2:
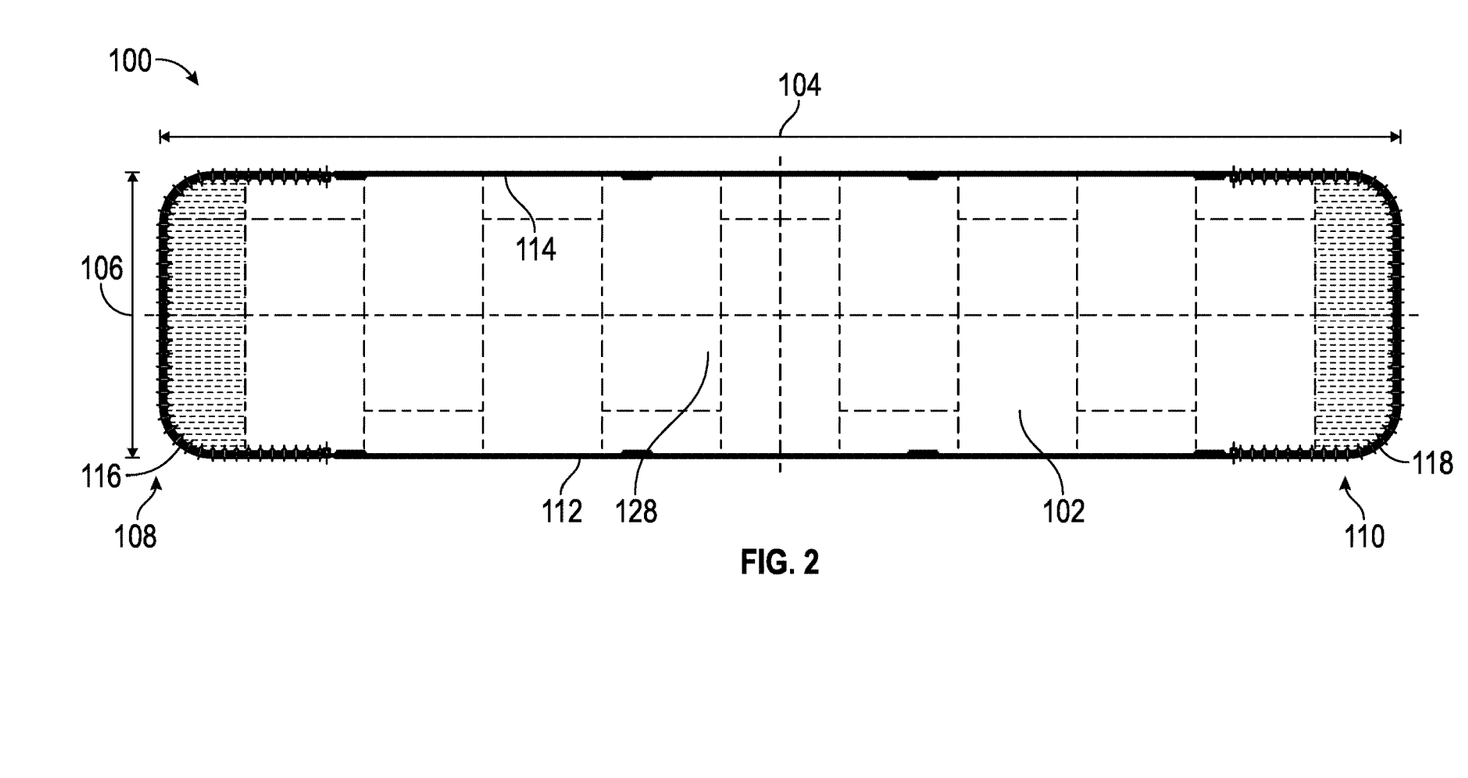
FIG. 2 is top view of an environmental containment device according to the present disclosure.

FIG. 2 shows a top view of an environmental containment device. The environmental containment device 100 can be configured to receive one or more storage containers (not shown) therein. The one or more storage containers can contain environmentally sensitive fluids, gels, or other materials and be placed within the environmental containment device 100 for temporary or permanent storage. The containment space 128 is sized to accommodate the approximate volume of fluid within the one or more storage containers, and thus provides secondary containment in the event of a leak of one or more of the one or more storage containers.

The flexible edge 124 disposed on the longitudinal edges 112, 114 provide extend length for ingress and egress of vehicles to load and/or remove storage containers from the containment space 128. The flexible edge 124 can deflect into the containment space 128, relative to vertical, during ingress of a vehicle into the containment space 128, and deflect away from the containment space 128, relative to vertical, during egress of a vehicle from the containment space 128.

Figure 3:
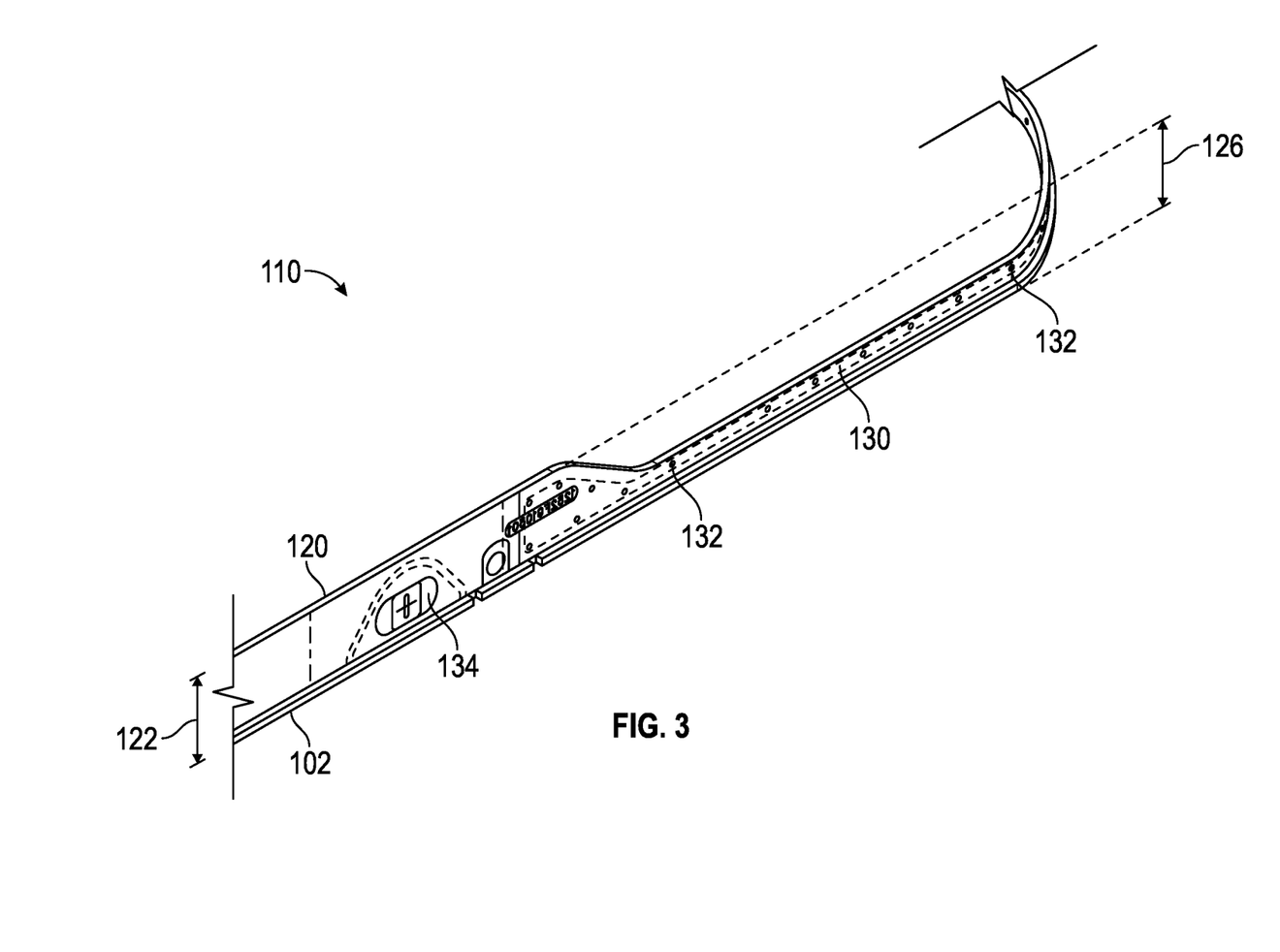
FIG. 3 is a detailed isometric view of one end of an environmental containment device according to the present disclosure.
Figure 4:
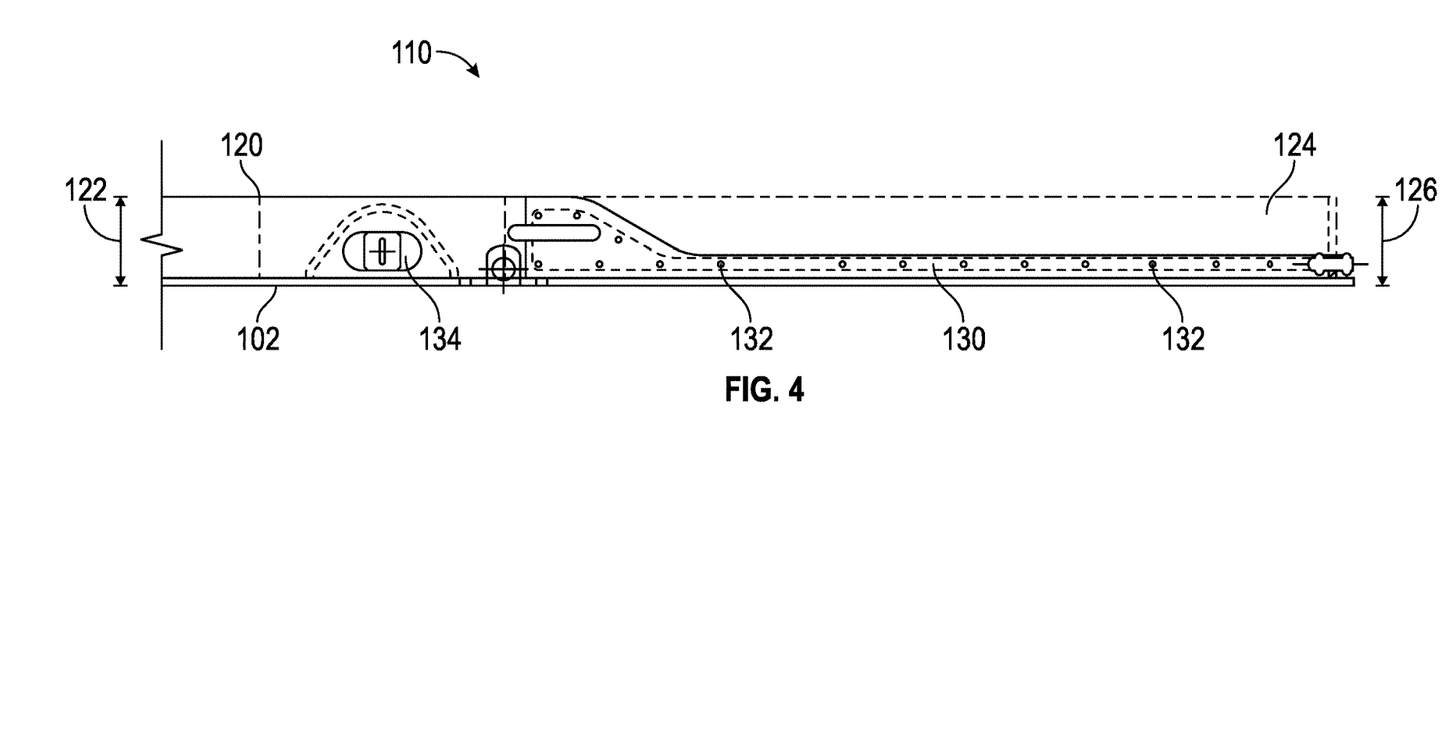
FIG. 4 is a elevational view of one end of an environmental containment device according to the present disclosure.

FIG. 3 shows a detailed isometric view of one end of an environmental containment device. FIG. 4 shows a detailed elevational view of one end of an environmental containment device. The baseplate 102 can include a rigid lip 130 extending at least a portion lateral edge 116, 118. The rigid lip 130 can extend substantially the same distance along the perimeter of the baseplate 102 as the flexible sidewall 124. The rigid lip 130 can vertically extend away from baseplate 102 a height less than the predetermined height 122.

In at least on example, the rigid lip 130 provides a coupling point between the baseplate 102 and the flexible sidewall 124. While the flexible sidewall 124 is shown coupled with the rigid lip 130 by a plurality of fasteners 132, the flexible sidewall 124 can couple with the rigid lip 130 and the baseplate 102 in any suitable manner to form a fluidic, leak-proof seal. The rigid lip 130 can be coupled with the baseplate 102 in the same manner as the rigid sidewall 120 including but not limited to, welded, fasteners, integrally formed, or any combination thereof.

The flexible sidewall 124 can have an elasticity to allow deflection toward and away from the baseplate relative to the vertically extending direction upon application of a force. In at least one example, the flexible sidewall 124 can be displaced inward by a vehicle or forklift driving over the flexible sidewall 124 and onto the baseplate 102. The flexible sidewall 124 can similarly displace away from the baseplate 102 upon exit of the vehicle or forklift. In at least one example, the vehicle can enter the environmental vehicle container at one end 108, 110 of the baseplate 102 and exit the environmental containment device 100 from the opposing end 108, 110.

Figure 5:
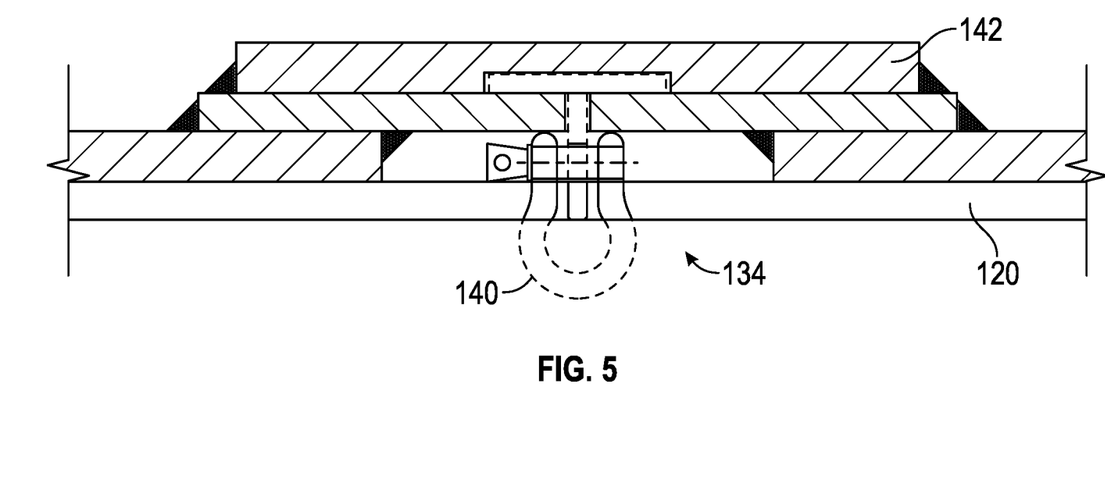
FIG. 5 is a detailed view of a lifting lug of an environmental containment device according to the present disclosure.

FIG. 5 shows a lift lug of an environmental containment device. The environmental containment device 100 can include one or more lift lugs 134 disposed along the longitudinal edges 112, 114 and/or lateral edges 116, 118. The one or more lift lugs 134 can assist in lifting, positioning, and/or moving the environmental containment device 100. In at least one example, the one or more lift lugs 134 can have eye-hooks 140 configured to couple the environmental containment device 100 to a lifting machine, for example a crane or forklift.

The one or more lift lugs 134 can be evenly distributed along one of the longitudinal length 104 or the lateral width 106. In at least one example, the environmental containment device 100 has two lift lugs disposed on each longitudinal edge 112, 114 and integrated with the rigid sidewall 120. The one or more lift lugs 134 can be integrally formed with the rigid sidewall 120 or separately integrated therewith, such as through the bolts and/or fasteners. The one or more lift lugs 134 can include a sealing mechanism 142 to ensure the any bolt or fastener extending through the rigid sidewall 120 does not induce a fluidic leak from the containment space 128.

Figure 6:
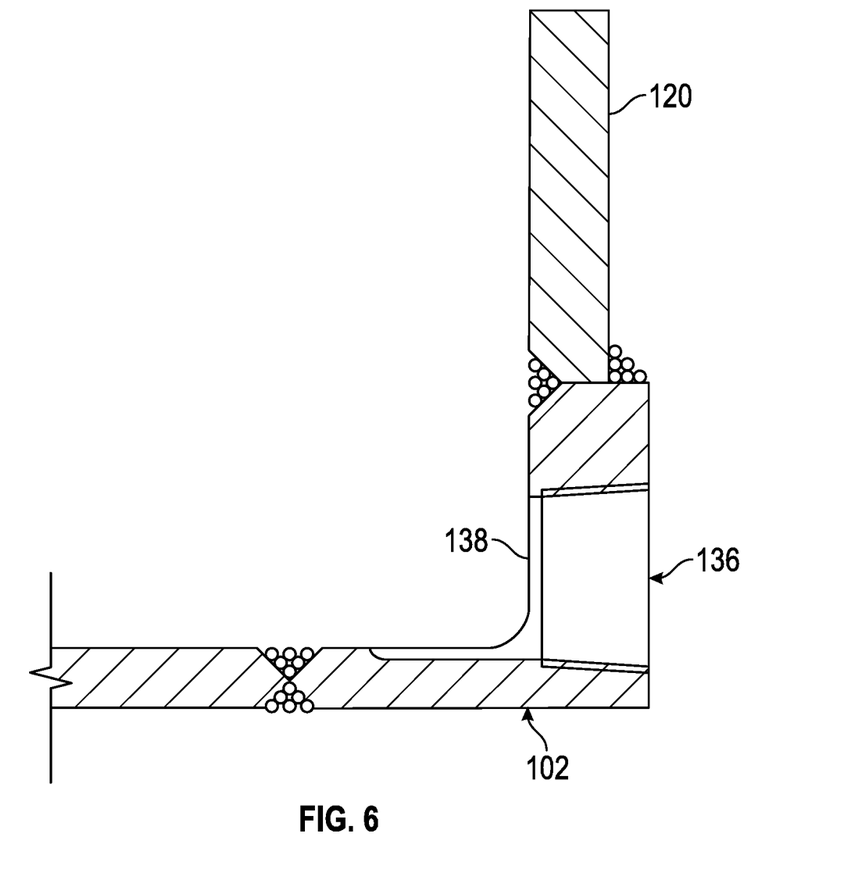
FIG. 6 is a detailed view of a drain valve of an environmental containment device according to the present disclosure.

FIG. 6 details a drain of an environmental containment device. The environmental containment device 100 can include one or more drains 136. The one or more drains 136 can provide fluidic communication between the containment space 128 through the rigid sidewall 120. The one or more drains 136 can include a valve 138 allowing user control of fluidic communication with the containment space 128. The valve 138 can be manually operated, such as a ball valve, or can be computer controlled and/or operated remotely.

The one or more drains 136 can allow removal of fluid from the containment space 128 in the event of fluid leakage from the one or more storage containers. In at least one example, a hose can be coupled with the one or more drains 136 to remove fluid from the containment space.

In another example, the one or more drains can couple adjacent environmental containment devices 100 together, thereby allowing each individual containment space 128 for form a collective containment space.

Figure 7:
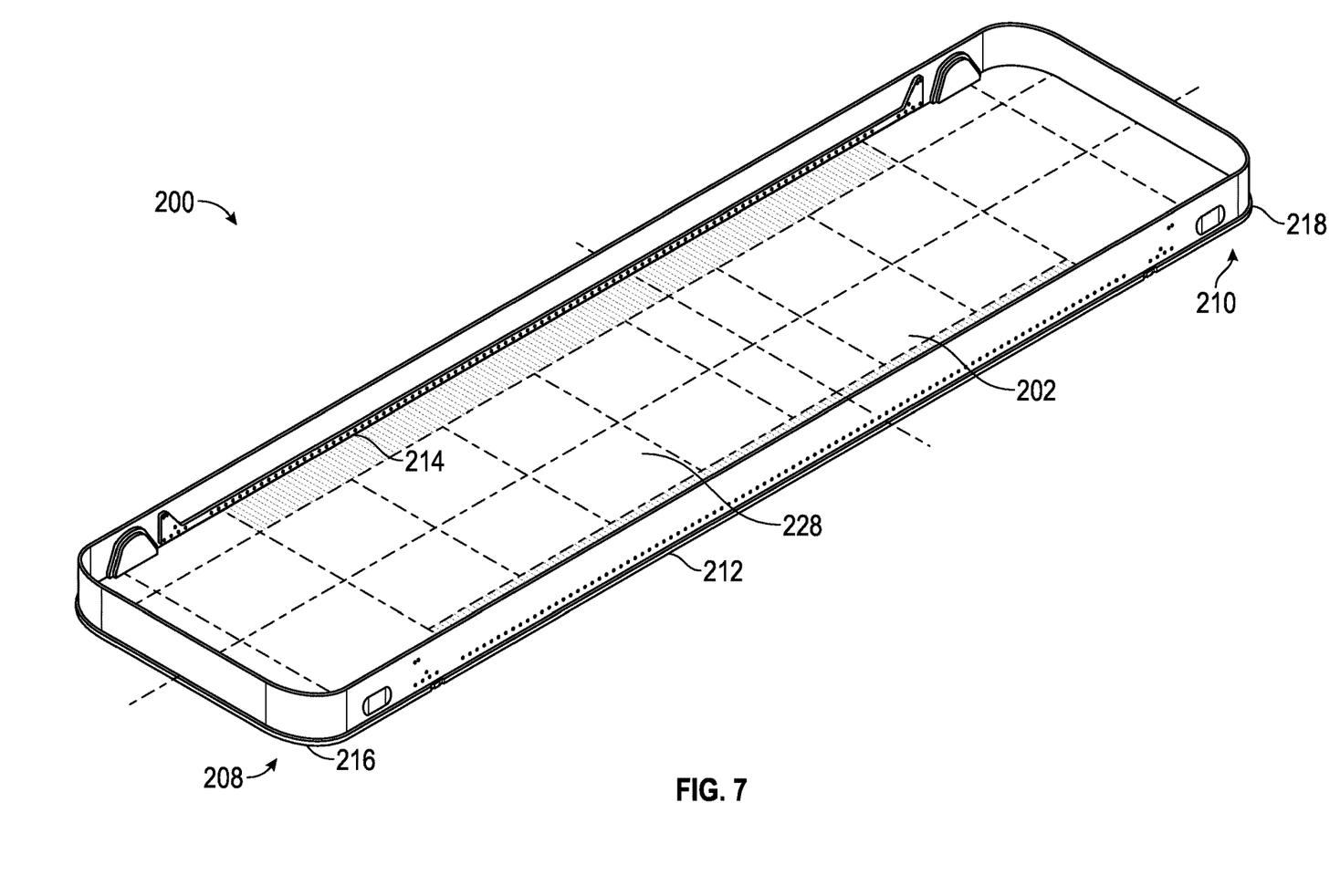
FIG. 7 is an isometric view of a second embodiment of an environmental containment device according to the present disclosure.

FIG. 7 shows a second embodiment of an environmental containment device. An environmental containment device 200 can have a baseplate 202 having longitudinal length 204 and a lateral width 206. The baseplate 202 can have two ends 208, 210 disposed at opposing ends of the longitudinal length 206.

The baseplate 202 can have two longitudinal edges 212, 214 extending along the longitudinal length and two lateral edges 216, 218 extending along the lateral width. The lateral edge 216 can be formed at one of the two opposing ends 208, 210 and can extend between and connect the two longitudinal edges 212, 214. The lateral edge 218 can be formed at the other of the two opposing ends 208, 210 and can extend between and connect the two longitudinal edges 212, 214.

A rigid sidewall 220 can be formed along at least a portion of each lateral edge 216, 218. The rigid sidewall 220 can be welded, fastened, integrally formed, or any combination thereof with the baseplate 202. In at least one example, the rigid sidewall 220 can be formed from the same material as the baseplate 202. The rigid sidewall 220 can vertically extended away from the baseplate 202 a predetermined height 222.

A flexible sidewall 224 can be formed along at least a portion of each longitudinal edge 212, 214. The flexible sidewall 224 can be formed from an elastomeric material. The flexible sidewall 224 can vertically extended away from the baseplate 202 a second predetermined height 226. The flexible sidewall 224 can also extend along at least a portion of the lateral edge 216, 218. In at least one example, the flexible sidewall 124 extends along a portion of the longitudinal edge 212, 214 and overlaps a portion of the rigid sidewall 220.

In at least one example, the predetermined height 222 and the second predetermined height 226 are the same. In other examples, the predetermined height 222 of the rigid sidewall 220 can be greater than or less than the second predetermined height 226 of the flexible sidewall 224.

The baseplate 202, rigid sidewall 220, and flexible sidewall 224 can collectively define a containment space 228. The containment space 228 can be a leak-proof volume configured to receive and/or contain one or more fluids, gels, or other fluidic materials. The predetermined height 222 and second predetermined height 226 can substantially define the containment space 228 containment volume. In at least one example, the predetermined height 222 and second predetermined height 226 can be selected based on the desired containment volume within the containment space 228. In other examples, the size of the baseplate 202, predetermined height 222, and/or the second predetermined height 226 can be varied to obtain the desired containment volume within the containment space 228.

The flexible sidewall 224 can allow deflection, or deviation, from the vertical during load to allow vehicles, carts, or other storage container carrying devices to enter the containment space 228 to add or remove one or more storage containers.

The flexible sidewall 224 can have an elasticity to allow deflection toward and away from the baseplate relative to the vertically extending direction upon application of a force. In at least one example, the flexible sidewall 224 can be displaced inward by a vehicle or forklift driving over the flexible sidewall 224 and onto the baseplate 202. The flexible sidewall 224 can similarly displace away from the baseplate 202 upon exit of the vehicle or forklift. In at least one example, the vehicle can enter the environmental vehicle container at longitudinal edge 212, 214 of the baseplate 202 and exit the environmental containment device 200 from the opposing longitudinal edge 212, 214.

Figure 8:
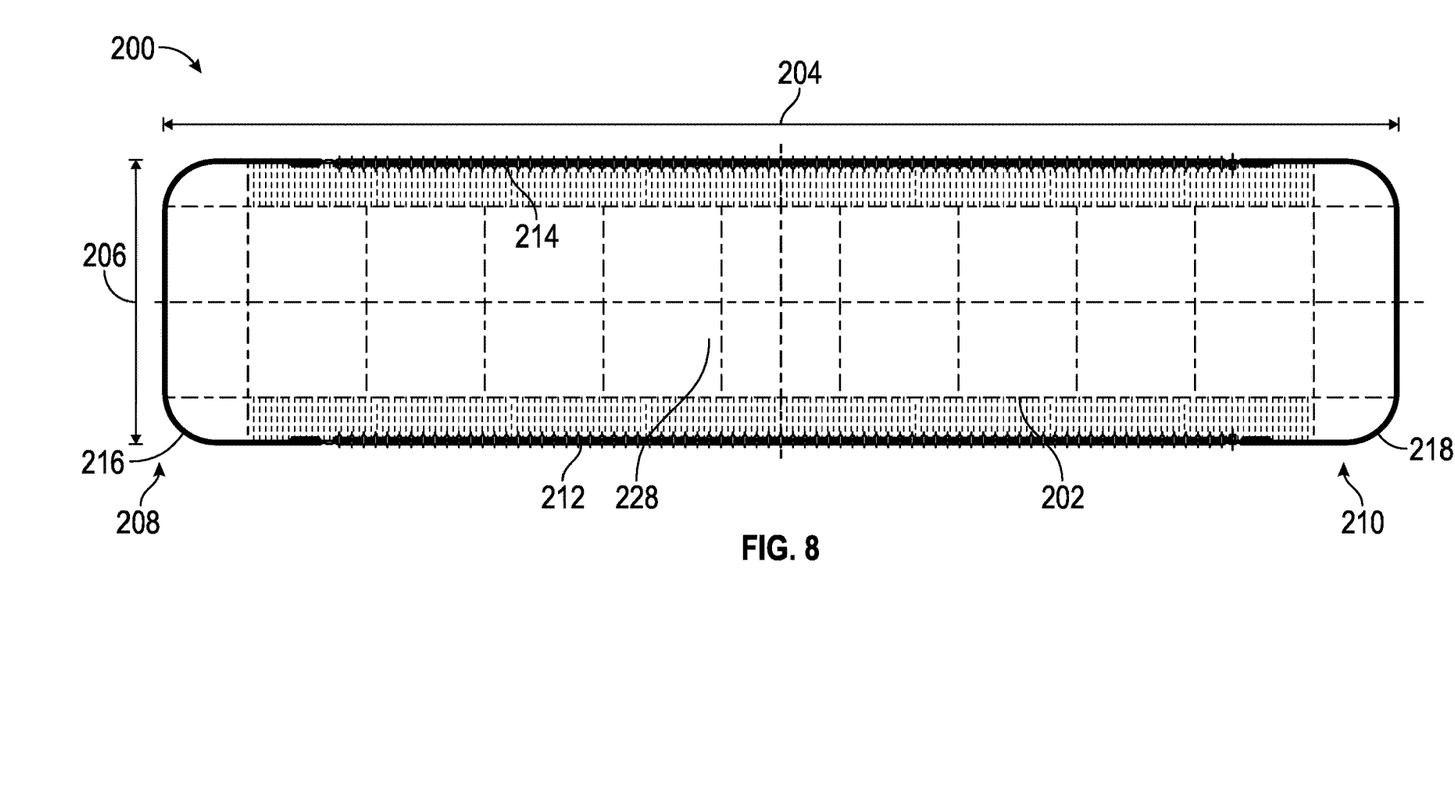
FIG. 8 is a top view of a second embodiment of an environmental containment device according to the present disclosure.

FIG. 8 shows a top view of an environmental containment device. The environmental containment device 200 can be configured to receive one or more storage containers (not shown) therein. The one or more storage containers can contain environmentally sensitive fluids, gels, or other materials and be placed within the environmental containment device 200 for temporary or permanent storage. The containment space 228 is sized to accommodate the approximate volume of fluid within the one or more storage containers, and thus provides secondary containment in the event of a leak of one or more of the one or more storage containers.

The flexible edge 224 disposed on the longitudinal edges 212, 214 provide extend length for ingress and egress of vehicles to load and/or remove storage containers from the containment space 228. The flexible edge 224 can deflect into the containment space 228, relative to vertical, during ingress of a vehicle into the containment space 228, and deflect away from the containment space 228, relative to vertical, during egress of a vehicle from the containment space 228.

Environmental containment device 200 can be integrated with any features described above with respect to environmental containment device 100 including but not limited to, one or more drains and one or more lifting points. In at least one example, environmental containment device 200 can have one or more drains coupled with a lateral edge 216, 218 and/or a longitudinal edge 212, 214 allowing a plurality of environmental containment devices 200 to be fluidically coupled either side-by-side (as shown in FIG. 9) or end-to-end.

While the environmental containment devices 100, 200 are described with respect to specific arrangements of rigid sidewalls and flexible sidewalls, the environmental containment devices 100, 200 can have entire perimeter of flexible sidewall, intermittent flexible sidewall along the perimeter, or any combination thereof.

Figure 9:
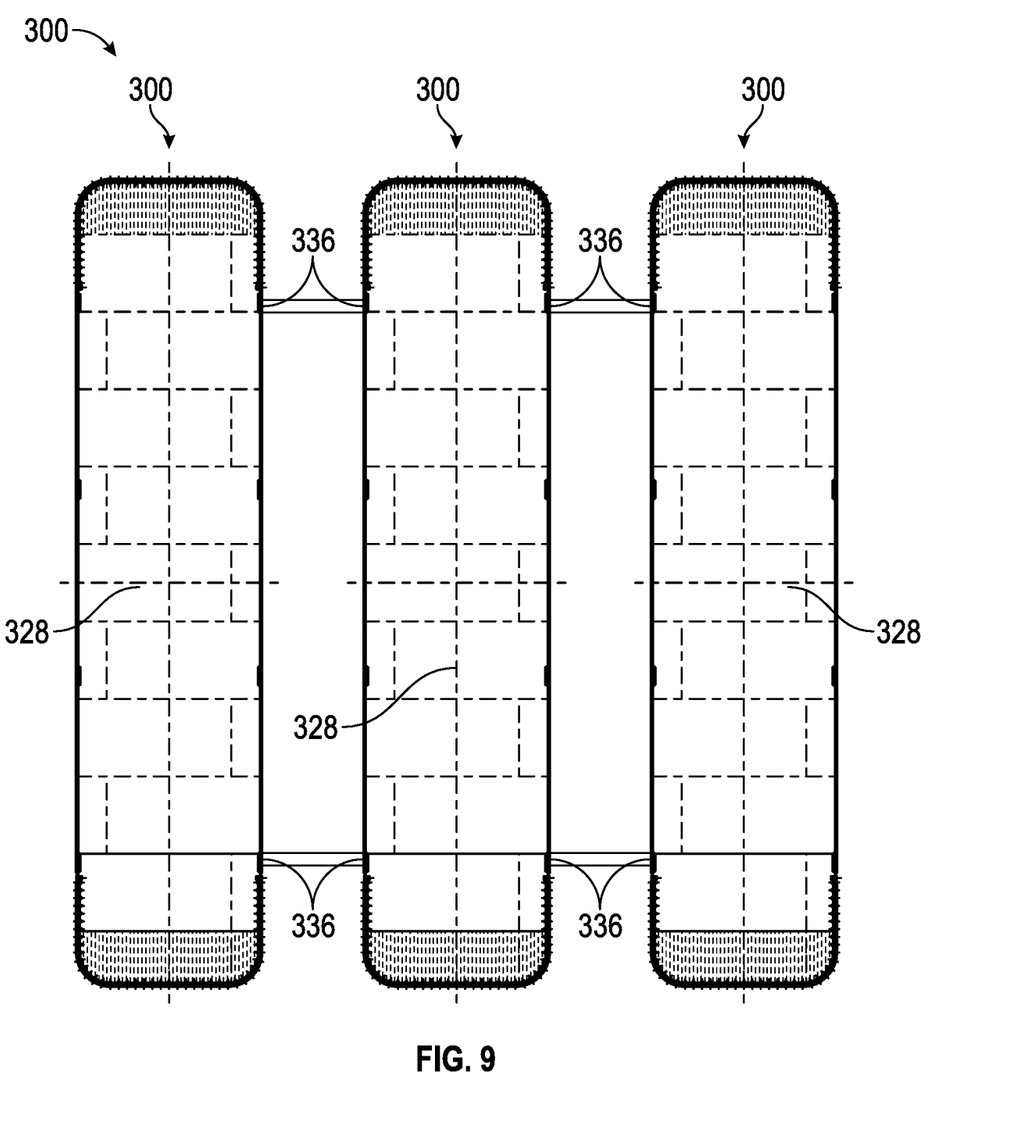
FIG. 9 is a top view of an environmental containment system according to the present disclosure.

FIG. 9 shows a plurality of environmental containment devices coupled together. An environmental containment device 100 can be coupled with adjacent environmental containment devices 100 to collectively form an environmental containment system 300. The environmental containment system 300 can include a plurality of containment devices 100 in fluid communication one to the other. In at least one example, the one or more drains 136 of a first environmental containment device 100 can be coupled with one or more drains 136 of an adjacent second environmental containment device 100. The coupling between drains 136 can provide fluidic communication between the containment space 128 of the first environmental containment device 100 and the adjacent environmental containment device 100.

The fluidic communication between containment spaces 128 can prevent overflow of fluid leaking from one or more storage containers into the environment by allowing diversion of fluid to adjacent containment spaces 128.

While the present disclosure is described with respect to specific examples, one of ordinary skill in the art would appreciate that elements from each example can be implemented within other examples without deviating from the present disclosure.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. An environmental containment device, comprising:
   a baseplate extending a longitudinal length and two ends disposed at opposing ends of the longitudinal length, the baseplate having two longitudinal edges extending along the longitudinal length and two lateral edges extending along a lateral width of the baseplate;
   a flexible sidewall extending along at least a portion of at least one of the lateral edges and/or longitudinal edges, the flexible sidewall vertically extending away from the baseplate a predetermined distance;
   wherein at least a portion of the predetermined distance of the flexible sidewall is operably deflectable relative to a vertical axis under a load;
   wherein the baseplate and flexible sidewall collectively define a containment space.

2. The environmental containment device of claim 1, wherein the flexible sidewall extends along at least a portion of at least one longitudinal edge, overlapping at least a portion of a rigid sidewall, the rigid sidewall vertically extending away from the baseplate a second predetermined distance.

3. The environmental containment device of claim 2, wherein the predetermined distance and the second predetermined distance are equal.

4. The environmental containment device of claim 1, further comprising a rigid lip extending at least a portion of each of the lateral edges, the rigid lip vertically extending away from the baseplate less than the predetermined distance.

5. The environmental containment device of claim 4, wherein the flexible sidewall is secured to the rigid lip by fasteners.

6. The environmental containment device of claim 1, further comprising one or more lift points disposed along the longitudinal length.

7. The environmental containment device of claim 1, further comprising one or more drains disposed along the length of the longitudinal length and in fluidic communication with the containment space.

8. The environmental containment device of claim 1, wherein the flexible sidewall is formed from an elastomeric material.

9. The environmental containment device of claim 1, further comprising one or more drains disposed along the baseplate perimeter and in fluidic communication with the containment space.

10. An environmental containment device, comprising:
    a baseplate extending a longitudinal length and having two ends disposed at opposing ends of the longitudinal length, the baseplate having two longitudinal edges extending along the longitudinal length and two lateral edges extending along a lateral width of the baseplate, wherein the two longitudinal edges and the two lateral edges collectively form a baseplate perimeter;
    a flexible sidewall extending along the baseplate perimeter, the flexible sidewall vertically extending away from the baseplate a predetermined distance;
    wherein at least a portion of the predetermined distance of the flexible sidewall is operably deflectable relative to a vertical axis under a load,
    wherein the baseplate and flexible sidewall collectively define a containment space.

11. The environmental containment device of claim 10, wherein a rigid sidewall extends along at least a portion of each longitudinal edge and the flexible sidewall extends along at least a portion of at least one lateral edge, the rigid sidewall vertically extending away from the baseplate a second predetermined distance.

12. The environmental containment device of claim 11, wherein the rigid sidewall extends along at least a portion of each lateral edge and the flexible sidewall extends along at least a portion of at least one longitudinal edge.

13. The environmental containment device of claim 10, further comprising a rigid lip extending at least a portion of the baseplate perimeter, the rigid lip vertically extending away from the baseplate less than the predetermined distance.

14. The environmental containment device of claim 13, wherein the flexible sidewall is secured to the rigid lip by fasteners.

15. The environmental containment device of claim 10, further comprising one or more lift points disposed along the baseplate perimeter.

16. An environmental containment device, comprising:
    a baseplate extending a longitudinal length and two ends disposed at opposing ends of the longitudinal length, the baseplate having two longitudinal edges extending along the longitudinal length and two lateral edges extending along a lateral width of the baseplate;
    a rigid sidewall extending at least a portion of each of the lateral edges, the rigid sidewall vertically extending away from the baseplate a predetermined distance;
    a flexible sidewall extending along at least a portion of at least one of the longitudinal edges, the flexible sidewall vertically extending away from the baseplate a second predetermined distance;
    wherein at least a portion of the second predetermined distance of the flexible sidewall is operably deflectable relative to a vertical axis under a load,
    wherein the baseplate, rigid sidewall, and flexible sidewall collectively define a containment space.

17. The environmental containment device of claim 16, wherein the flexible sidewall extends along at least a portion of the lateral edge, overlapping at least a portion of the rigid sidewall.

18. The environmental containment device of claim 16, further comprising a rigid lip extending at least a portion of each of the longitudinal edges, the rigid lip vertically extending away from the baseplate less than the predetermined distance.

19. The environmental containment device of claim 18, wherein the flexible sidewall is secured to the rigid lip by fasteners.

20. The environmental containment device of claim 16, further comprising one or more lift points disposed along one of the longitudinal length or the lateral length.

21. The environmental containment device of claim 16, further comprising one or more drains disposed along one of the longitudinal length or the lateral length, the one or more drains in fluidic communication with the containment space.

22. The environmental containment device of claim 16, wherein the flexible sidewall is formed from an elastomeric material.

23. The environmental containment device of claim 16, wherein the predetermined distance and the second predetermined distance are equal.

* * * * *